United States Patent
Grinshpun et al.

(10) Patent No.: US 6,844,055 B1
(45) Date of Patent: Jan. 18, 2005

(54) HOLLOW STRANDFOAM AND PREPARATION THEREOF

(75) Inventors: Vyacheslav D. Grinshpun, Midland, MI (US); Michael E. Schaller, Midland, MI (US); Martin H. Tusim, Midland, MI (US); Andrew R. Brush, Midland, MI (US); Jonathan D. Park, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 286 days.

(21) Appl. No.: 09/706,110

(22) Filed: Nov. 3, 2000

Related U.S. Application Data

(60) Provisional application No. 60/168,562, filed on Dec. 2, 1999.

(51) Int. Cl.[7] ............................. B32B 5/12; B32B 3/26; B32B 3/00; B32B 9/00; B32B 27/36

(52) U.S. Cl. .................. 428/304.4; 428/106; 428/109; 428/313.3; 428/313.5; 428/314.4; 428/314.8; 428/318.4; 428/412; 428/423.1; 428/425.1; 428/473.5; 428/474.4; 428/479.3; 428/480; 428/481; 428/500; 428/532

(58) Field of Search ...................... 428/314.8, 105–111, 428/114, 304.4, 311.11, 311.51, 311.71, 313.3, 313.5, 314.4, 316.6, 317.9, 318.4, 411.1, 412, 423.1, 425.1, 473.5, 474.4, 479.3, 480, 481, 500, 507, 532

(56) References Cited

U.S. PATENT DOCUMENTS

| | | | | |
|---|---|---|---|---|
| 3,573,152 | A | 3/1971 | Wiley et al. | 161/60 |
| 3,713,762 | A | 1/1973 | Oisugu | 425/197 |
| 3,723,586 | A | 3/1973 | Foster et al. | 264/53 |
| 3,949,031 | A | 4/1976 | Fairbanks | 264/51 |
| 3,954,365 | A | 5/1976 | Barth et al. | 425/197 |
| 4,323,528 | A | 4/1982 | Collins | 264/53 |
| 4,753,841 | A | 6/1988 | Noel et al. | 428/174 |
| 4,755,208 | A | 7/1988 | Riley et al. | 71/79 |
| 4,755,408 | A | 7/1988 | Nöel | 428/36 |
| 4,801,484 | A | 1/1989 | Yao et al. | 428/294 |
| 4,824,720 | A | * 4/1989 | Malone | 428/294 |
| 4,952,450 | A | 8/1990 | Noel | 428/174 |
| 5,109,029 | A | 4/1992 | Malone | 521/79 |
| 5,110,841 | A | 5/1992 | Malone | 521/94 |
| 5,124,097 | A | 6/1992 | Malone | 264/51 |
| 5,348,795 | A | 9/1994 | Park | 428/220 |
| 5,527,573 | A | 6/1996 | Park et al. | 428/314.8 |
| 5,567,742 | A | 10/1996 | Park | 521/143 |
| 5,817,705 | A | 10/1998 | Wilkes et al. | 521/79 |
| 6,007,890 | A | * 12/1999 | DeBlander | 428/72 |
| 6,174,471 | B1 | * 1/2001 | Park et al. | 264/53 |
| 6,213,540 | B1 | * 4/2001 | Tusim et al. | 296/189 |
| 6,245,826 | B1 | * 6/2001 | Wilson et al. | 521/174 |

FOREIGN PATENT DOCUMENTS

| | | | |
|---|---|---|---|
| EP | 0 279 668 A2 | 8/1988 | B29C/67/22 |
| EP | 1 078 821 | 2/2001 | B60R/13/02 |
| GB | 1034120 | 1/1966 | |
| GB | 1061702 | * 3/1967 | |
| GB | 2 184 758 A | 11/1986 | |
| GB | 2 185 049 A | 11/1986 | |
| JP | 53-001262 | 1/1978 | B29C/47/12 |
| JP | 60-015114 A | 1/1985 | B29C/47/00 |
| JP | H6-263909 | 9/1994 | C08J/9/14 |

* cited by examiner

*Primary Examiner*—Sheeba Ahmed

(57) ABSTRACT

Prepare a foam structure that includes hollow coalesced foam strands and, optionally, solid coalesced foam strands using an extrusion die block equipped with apertures that promote forming the hollow strands and, optionally, the solid foam strands.

14 Claims, 5 Drawing Sheets

US 6,844,055 B1

HOLLOW STRANDFOAM AND PREPARATION THEREOF

This application is a continuation-in-part of 60/168,562 dated Dec. 2, 1999.

BACKGROUND OF THE INVENTION

This invention relates to foam structures comprising a plurality of hollow, coalesced foam strands, their preparation and use, and extrusion foaming dies suitable for use in fabricating such structures. This invention also relates to foam structures that include both hollow, coalesced foam strands and solid, coalesced foam strands together with their preparation and use, and extrusion foaming dies suitable for use in fabricating such structures.

A variety of patent publications relate to foamed objects that comprise a plurality of coalesced, distinguishable, expanded (foamed) polymer strands (strand foams). Illustrative publications include U.S. Pat. No. 3,573,152 (column 2, lines 19–35, column 2, line 67 through column 3, line 30, column 4, line 25 through column 5, line 19 and column 5, line 64 through column 6, line 46); U.S. Pat. No. 4,801,484 (column 1, lines 12–21, column 2, line 55 through column 5, line 8, column 5, lines 16–50 and column 5, line 60 through column 6, line 6); U.S. Pat. No. 4,824,720 (column 2, lines 57–68, column 3, line 57 through column 5, line 32 and column 5, lines 50–58); U.S. Pat. No. 5,124,097 (column 3, line 34 through column 4, line 3, column 5, line 31 through column 6, line 11 and column 6, lines 36–54); U.S. Pat. Nos. 5,110,841; 5,109,029 and; European Patent Application (EP-A) 0 279,668; Japanese Patent Application numbers (JP) 60-015114-A; 53-1262 and H6-263909. The relevant portions of such publications, especially those specifically noted, are incorporated herein by reference.

In general terms, strand foam preparation includes extrusion of a foamable material, typically a thermoplastic polymer material, through a multi-orifice die plate to generate individual foam able strand elements. The strands expand and coalesce (e.g. proximate strands contact each other along at least a surface portion of their respective lengths while the strands retain sufficient surface tackiness to effect strand-to-strand adhesion) after emerging from the die plate, yet remain distinguishable following recovery of the strand foam. Typical strands have a circular cross-section where the die orifices or apertures are circular. Altering the orifice shape to a slot, a square or a special shape leads to a corresponding partial alteration in strand cross-section. Partial alteration results from a tendency of strands exiting a die orifice to round with foaming rather than hold true to an aperture shape.

Strand foams offer a number of performance advances. For example, strand foams have excellent strength in a plane transverse to the direction of extrusion. They provide a predetermined shape with little or no need to trim. They function as low density products with distinguishable coalesced cellular strands. With the ability to change or alter die orifice shape and arrangement, strand foams readily adapt to variations in shape.

SUMMARY OF THE INVENTION

In one aspect, this invention is a method for producing a hollow multistrand or hollow coalesced strand foam article comprising:

a. providing a foamable composition comprising a blowing agent composition and at least one film-forming composition, the foamable composition being in a gel state;

b. extruding the foamable composition through a die having a plurality of first orifices, each of which yields a hollow extrudate;

c. converting the hollow extrudate into foamed hollow extrudate strands at a temperature that promotes foam bubble stability; and d. allowing the foamed hollow extrudate strands to contact each other while such strands retain at least some surface tackiness in order to effect adhesion between adjacent individual strands and yield a hollow multistrand foam extrudate.

When the foamable gel comprises a polymer with a glass transition temperature (Tg) near the temperature of steam (nominally 100° C. at atmospheric pressure) (e.g. polystyrene or a blend of polystyrene with another polymer such as an ethylene/styrene interpolymer), the method optionally includes a sequential step e. Step e. comprises exposing the hollow multistrand foam extrudate to steam for a period of time sufficient to reduce foam density below that of the as-foamed hollow extrudate strands. Normal pressure steam produces satisfactory results in one minute. Longer or shorter times may be used as desired depending upon a variety of factors such as desired density reduction and apparatus operating parameters. Step e. can immediately follow step d. in a sequential fashion or, the hollow multistrand foam extrudate of step d. can be recovered and later treated as in Step e.

Recovery of the hollow multistrand foam extrudate employs conventional processing and handling techniques. For example, one may cool the hollow multistrand extrudate to a temperature that allows further handling while substantially maintaining foam dimensional stability.

The film-forming composition preferably includes at least one foamable material, preferably a thermoplastic polymer. The present invention includes, however, materials other than thermoplastic polymers. Virtually any material that forms a film also forms a bubble or foam and, as such, qualifies as a "foamable material". As long as the foam has sufficient dimensional stability to form a hollow foam strand, together with adequate physical properties and product life for a desired end use, it falls within the scope of the present invention.

The blowing agent composition must simply effect foaming of the film-forming composition. Components of such a composition at least partially determine temperatures used in preparing the hollow coalesced strand foams of the present invention. Components of the film-forming composition also contribute to determining such temperatures. For example, when the film-forming material is a thermoplastic polymer, extrusion typically occurs at a temperature above the polymer's $T_g$, or for those having sufficient crystallinity to have a melt temperature ($T_m$), near the $T_m$. "Near" means at, above, or below and largely depends upon where stable foam exists. The temperature desirably falls within 30° centigrade (° C.) above or below the $T_m$. Skilled artisans can readily determine appropriate temperatures for any film-forming material, whether it is a thermoplastic polymer or some other material.

In a second aspect, this invention comprises an extrusion die for processing foamable polymer compositions, the die comprising a solid body having a first major planar surface and a spaced apart, substantially parallel second major planar surface, the body having defined therein a molten polymer receiving cavity having an open end where it intersects the second major planar surface and a closed end disposed between the first and second major planar surfaces, the first major planar surface having defined therein at least two sets of first apertures that are in fluid communication with the molten polymer receiving cavity and the first major planar surface, each first aperture set being spaced apart from other first aperture sets, with each aperture of a set having a shape that forms a portion or segment of a complete hollow geometric shape and all apertures in a single set being spaced apart from each other, but arranged in a manner sufficient to approximate the complete hollow geometric shape. When the complete shape is an annular ring, each segment preferably has a generally accurate shape. Each first aperture set desirably comprises at least two aperture segments that work in cooperative combination with each other to approximate the complete, hollow geometric shape. Using the annular or circular ring for purposes of illustration only, one variation of the set includes at least two generally accurate segments. Where only two such segments approximate the circular ring, each first aperture set has two generally semicircular apertures.

A preferred variation of the second aspect includes a foamable gel flow passageway formed by a cooperative combination of a circular aperture and a pin, plug, mandrel or other insert or device. As with the segment approach, skilled artisans can readily vary the shape of the aperture and associated pin or other device to effect a desired hollow geometric shape. The preferred variation comprises a two piece extrusion die for processing foamable polymer compositions, the die comprising a first solid body segment and a second solid body segment; the first solid body segment having a first major planar surface and a spaced apart, substantially parallel second major planar surface, the first body segment having defined therein a foamable composition receiving and distribution cavity, the cavity having an open end where it intersects the second major planar surface and a closed end disposed between the first and second major planar surfaces, the first body segment also having attached thereto a plurality of pins that begin at the closed end of the cavity and extend beyond the open end of the cavity; the second body segment having a first major planar surface and a spaced apart, substantially parallel second major planar surface, the second body segment having defined therein a plurality of spaced apart first apertures that are in fluid communication with both the first and second major planar surfaces; the first and second solid body segments, when assembled with the second major planar surface of the first segment proximate to the first major planar surface of the second segment, cooperating to provide a plurality of die gaps, the die gaps being formed by combinations of pins from the first body segment and the first apertures of the second body segment, the die gaps providing a fluid flow path from the foamable composition receiving and distribution cavity to the second major planar surface of the second segment.

A further variation of the second aspect, not shown in any of the figures, incorporates a plurality of third apertures that allow introduction of a fluid medium, blowing agent or other component inside at least one, preferably all, of the hollow foam strands. In the second aspect, each such third aperture is preferably defined within a boundary formed by the aperture segments. In the variation of the second aspect, each such third aperture is desirably defined within a corresponding pin. In either case, each third aperture is in fluid communication with both a source of the fluid medium, blowing agent or other component and the first major planar surface of the die embodied in FIG. 2 or that end of the pin proximate to the second major planar surface of the second body segment, whichever is appropriate.

In another variation of the second aspect, also not shown in a Figure, the cavity defined in the first body segment may be subdivided into two or more subcavities, each subcavity being in fluid communication with a foamable polymer composition source. This provides an option for using different foamable compositions in a single cellular foam structure.

In still another aspect, this invention is a cellular foam structure comprising a plurality of coalesced, hollow extruded strands. In a variation of this aspect, the foam structure further comprises a plurality of coalesced, solid (not hollow) foam strands. The solid and hollow strands need not be, but preferably are, formed from the same foamable composition.

In yet another aspect, this invention is an article of manufacture fabricated, at least in part, from the above cellular foam structure. The article of manufacture is desirably selected from the group consisting of sound insulation structures, thermal insulation structures, energy absorbing structures, packaging structures, cavity filling structures, air distribution structures, filter structures, impact energy management structures, surface leveling structures, fluid absorption and retention structures, object supporting structures, integrated building structures, geophysical structures, and bedding structures. Skilled artisans understand that this listing illustrates, but does not limit the invention. The foam structures of the invention have potential use in any known foam end use application.

These and other advantages of the invention will be apparent from the description that follows.

BRIEF DESCRIPTION OF THE DRAWINGS

FIG. 5b is a schematic cross-section of the two piece die block illustrated in FIG. 5a.

DETAILED DESCRIPTION OF THE INVENTION

The term "closed cells" typically refers to cells surrounded by resin membranes or "windows". By way of contrast, "open cells" designates cells in which some or all resin membranes or windows are perforated or missing.

Figure 1:
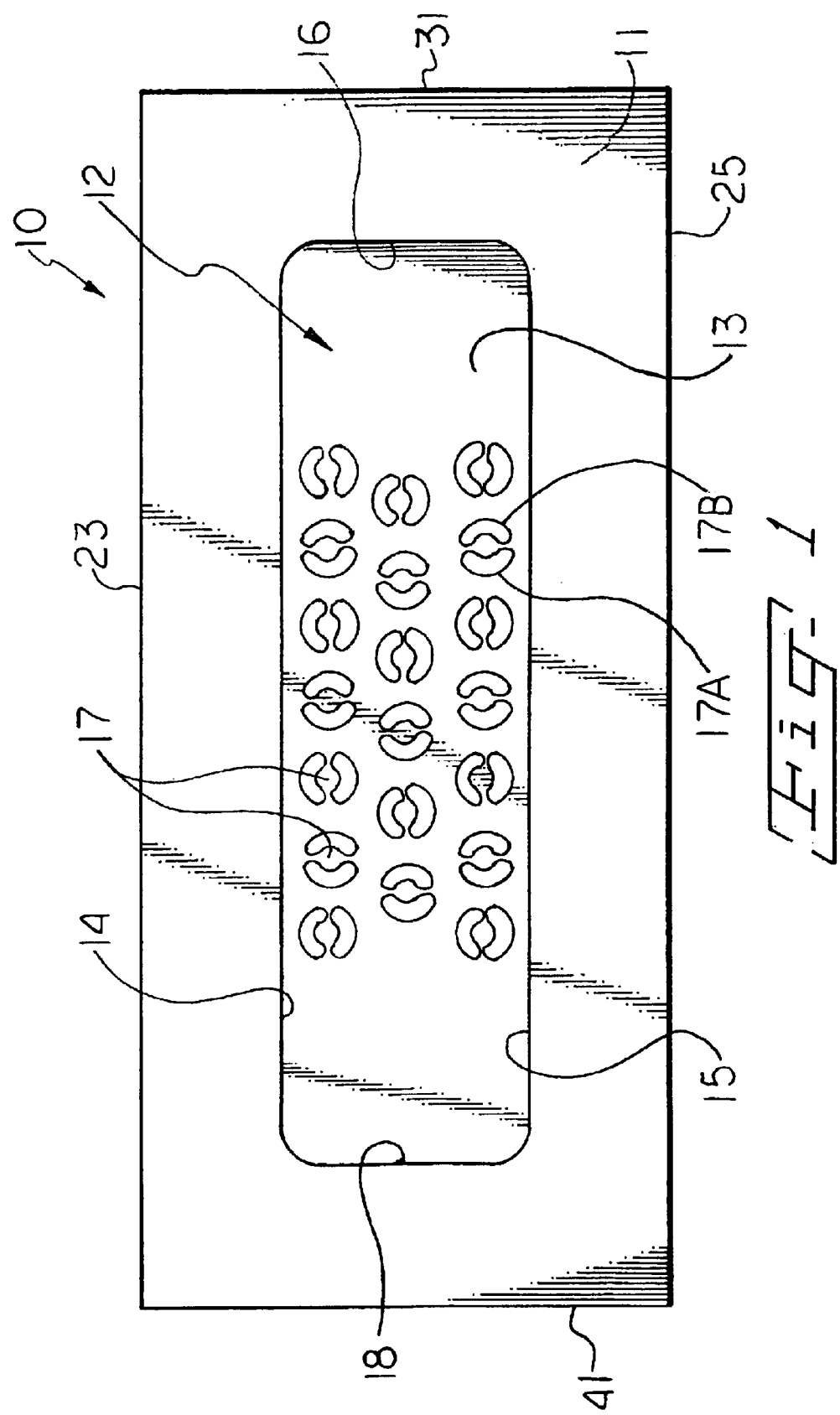
FIG. 1 is a schematic illustration of a bottom view of an extruder die block suitable for use in fabricating hollow foam tubes in accord with the present invention.

FIG. 1 schematically depicts an extruder die block, in accord with the present invention, generally designated by reference numeral 10. Die block 10 suitably comprises a trapezoidal solid having a bottom 11, a top 21 (not shown), a first side 23 and an opposed second side 25, a first end 31 and an opposed second end 41. Bottom 11 has defined therein a cavity 12. Cavity 12 has a bottom surface 13, a first side wall 14, a generally parallel second side wall 15 that is spaced apart from first side wall 14, a first end wall 16 and a generally parallel second end wall 18 that is spaced apart from first end wall 16. Each end wall desirably meets both sidewalls at a rounded, rather than square, corner. Bottom surface 13 has defined therein a plurality of aperture pairs 17. Each aperture pair consists of a first aperture 17A and a second aperture 17B. Each of the apertures 17A and 17B has an accurate shape with spaced apart, substantially parallel arcs that are joined together by rounded ends (sometimes referred to herein as a "half moon" shaped aperture). Apertures 17A and 17B preferably oppose, and are spaced apart from, each other in such a manner as to form two semicircular shapes.

Skilled artisans recognize that such a configuration favors formation of a foam tube when a foamable gel passes through apertures 17A and 17B. Skilled artisans also recognize that one may use three or more apertures to yield the same tubular shape, making appropriate adjustments to arc size (e.g. approximately 120° when using three apertures and approximately 90° when using four apertures). Although much of the following discussion refers to aperture pairs for simplicity, each reference to an aperture pair readily accommodates the greater numbers of apertures noted above. While a greater number of apertures may provide optimal results in fabricating larger foam tubes, skilled artisans understand that a corresponding increase in die complexity and its attendant cost may offset such results.

Figure 2:
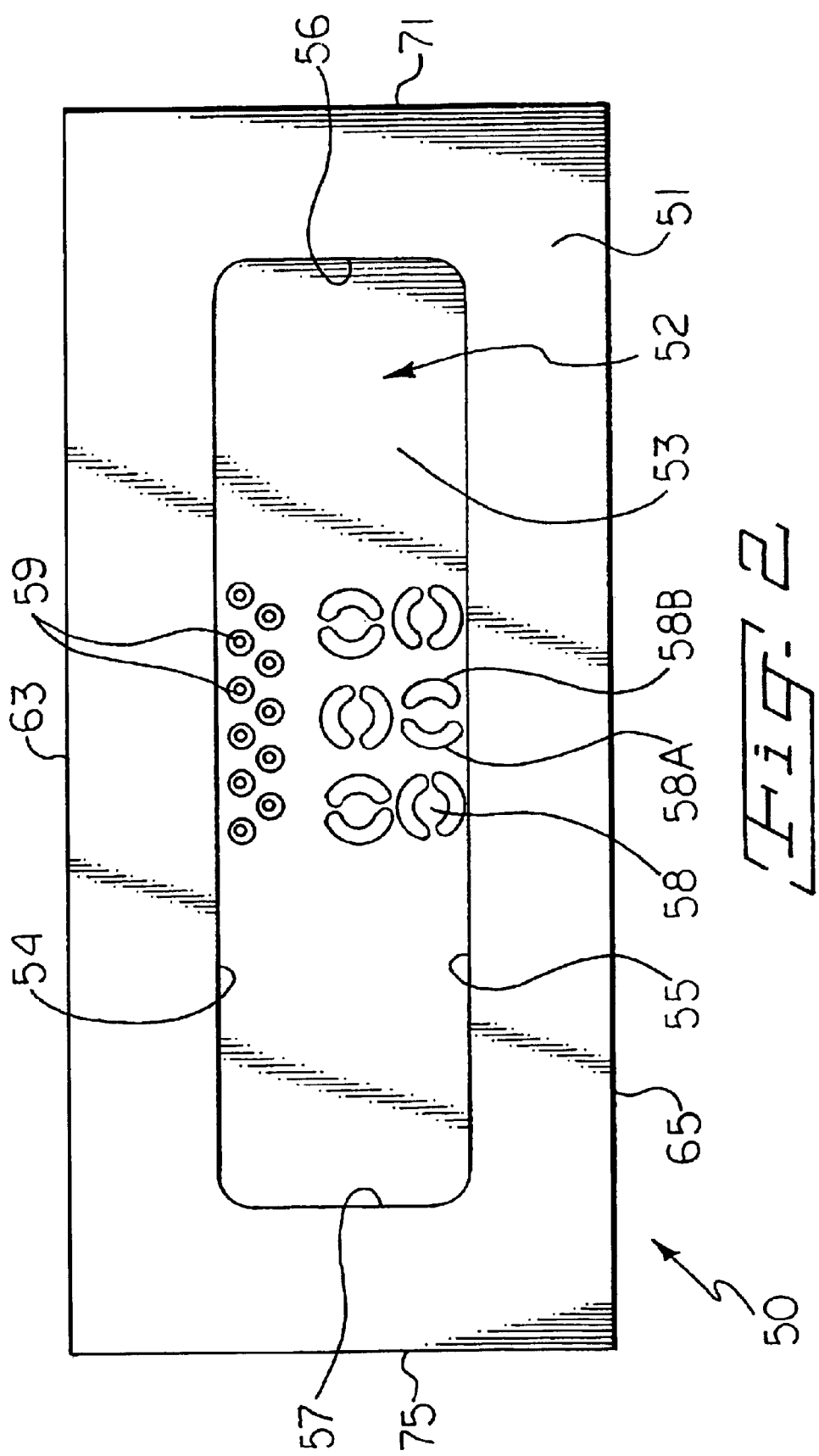
FIG. 2 is a schematic illustration of a bottom view of an extruder die block suitable for use in fabricating a combination of hollow foam tubes and solid foam strands in accord with the present invention.

FIG. 2 schematically shows a second extruder die block, in accord with the present invention, generally designated by reference numeral 50. Die block 50 suitably comprises a trapezoidal solid having a bottom 51, a top 65 (not shown), a first side 63 and an opposed second side 65, a first end 71 and an opposed second end 75. Bottom 51 has defined therein a cavity 52. Cavity 52 has a bottom surface 53, a first side wall 54, a generally parallel second side wall 55 that is spaced apart from first side wall 54, a first end wall 56 and a generally parallel second end wall 57 that is spaced apart from first end wall 56. As in FIG. 1, each end wall (56 and 57) desirably meets sidewalls 54 and 55 at rounded, rather than square, corners. Bottom surface 53 has defined therein a plurality of aperture pairs 58 and a plurality of single apertures 59. Each aperture pair 58 consists of a first aperture 58A and a second aperture 58B. Single apertures 59 desirably have a shape resembling that of a hollow truncated cone intersecting with a conduit. The shape also resembles that of a countersunk drill hole in a solid body. Conduits with the conical (countersunk) portion promote a lower open cell content than conduits of the same (identical) length, but without a conical portion. All apertures are preferably in fluid communication with both bottom surface 53 and cavity 52. As shown, aperture pairs or sets are gathered in one group and the single or second apertures form another group. As noted above, each aperture set may include three or more segments. In addition, the number of apertures shown in FIG. 2 merely illustrate the concept and a skilled artisan can readily determine appropriate aperture sizes, number of apertures and aperture sets as well as arrangement of such apertures and aperture sets.

Figure 3:
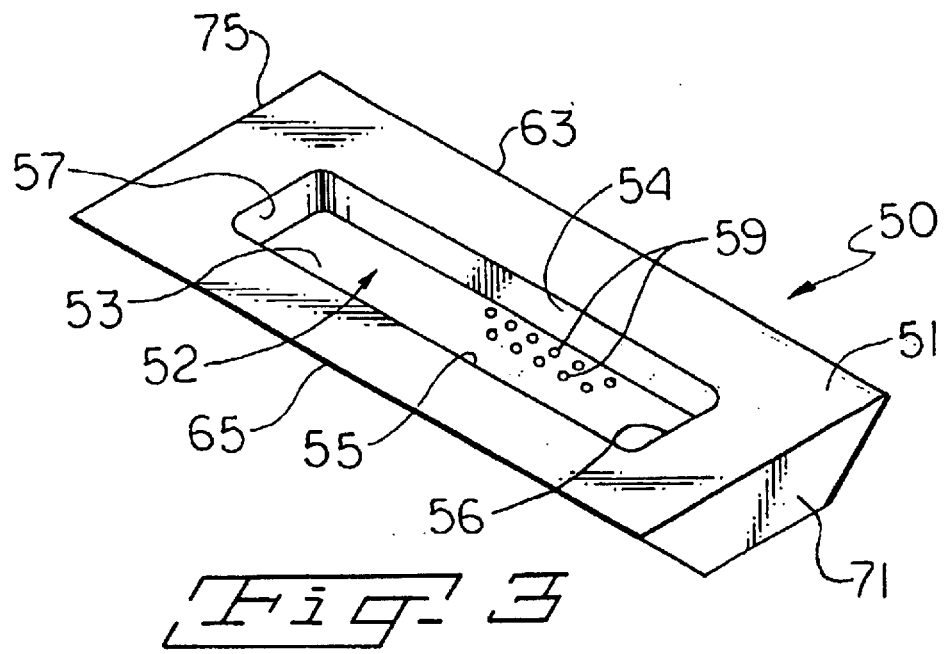
FIG. 3 is a bottom isometric illustration of the extruder die block of FIG. 2.

FIG. 3 shows, in a reduced isometric view, a schematic illustration of the extruder die block 50 shown in FIG. 2. FIG. 3 shows, using the same numbering convention as in FIG. 2, bottom 51, first side 63, second side 65, first end 71, second end 75, cavity 52, cavity bottom surface 53, single apertures 59, cavity side walls 54 and 55, cavity end walls 56 and 56, block ends 71 and 75 and block sides 63 and 65. FIG. 3 shows a desired trapezoidal shape of die block 50 as well as the shape of cavity 52 more clearly than FIG. 2.

Figure 4:
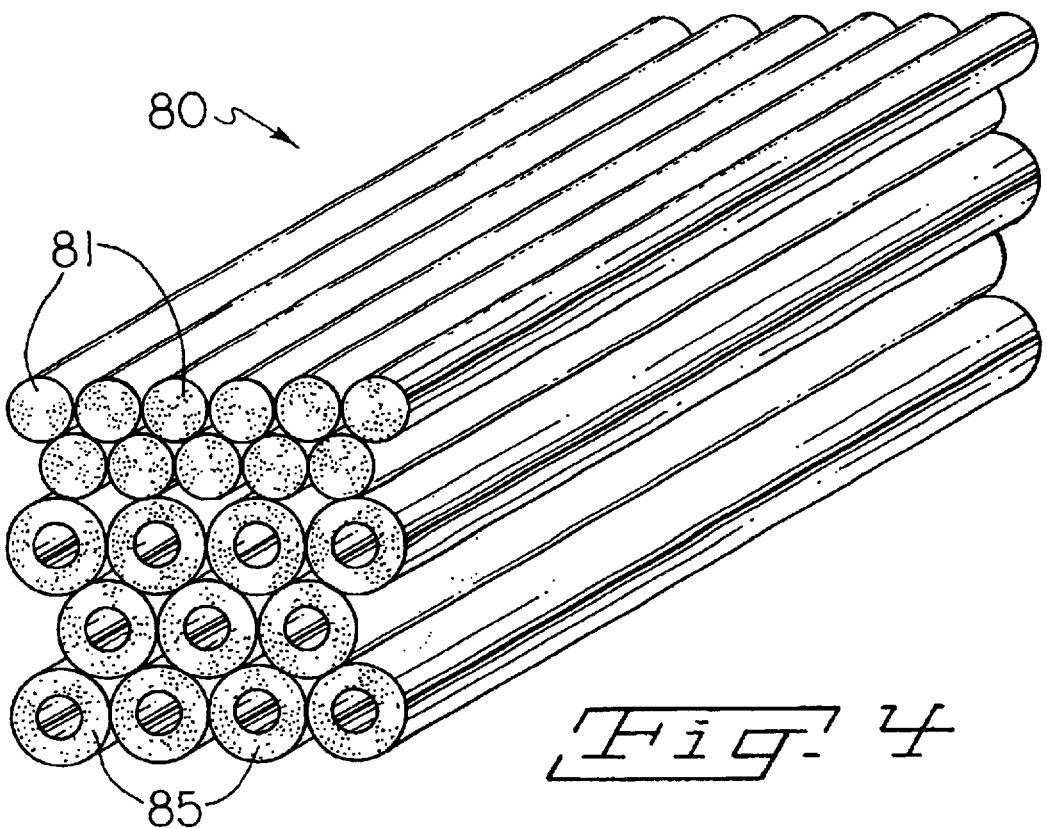
FIG. 4 is an isometric illustration of an article having both solid coalesced foam strands and hollow coalesced foam strands.

FIG. 4 schematically illustrates a foam structure or sheet 80 that could be produced by the extruder block shown in FIG. 3 or a variation thereof. Foam sheet 80 comprises two rows of coalesced solid foam strands 81 and three rows of coalesced hollow foam strands 85. FIG. 4 shows all solid foam strands 81 in one segment or section and all hollow foam strands 85 in another segment or section. In addition, all solid foam strands 81 have one size and all hollow foam strands 85 have another size. Skilled artisans can readily vary the number, size and spatial arrangement of the solid and hollow foam strands to approximate virtually any shape without departing from the scope and spirit of the present invention. For example, the apertures in an extruder block, such as that of FIG. 3, may be arranged in a staggered configuration, a square configuration or both. One such variation includes a mixture of sizes of both solid and hollow foam strands to attain a desired density profile. Another such variation adds a second section or segment of solid foam strands in such a manner as to sandwich a hollow foam strand section between two solid foam strand sections. Conversely, a solid foam strand segment may lie between two hollow foam strand foam segments.

Figure 5A:
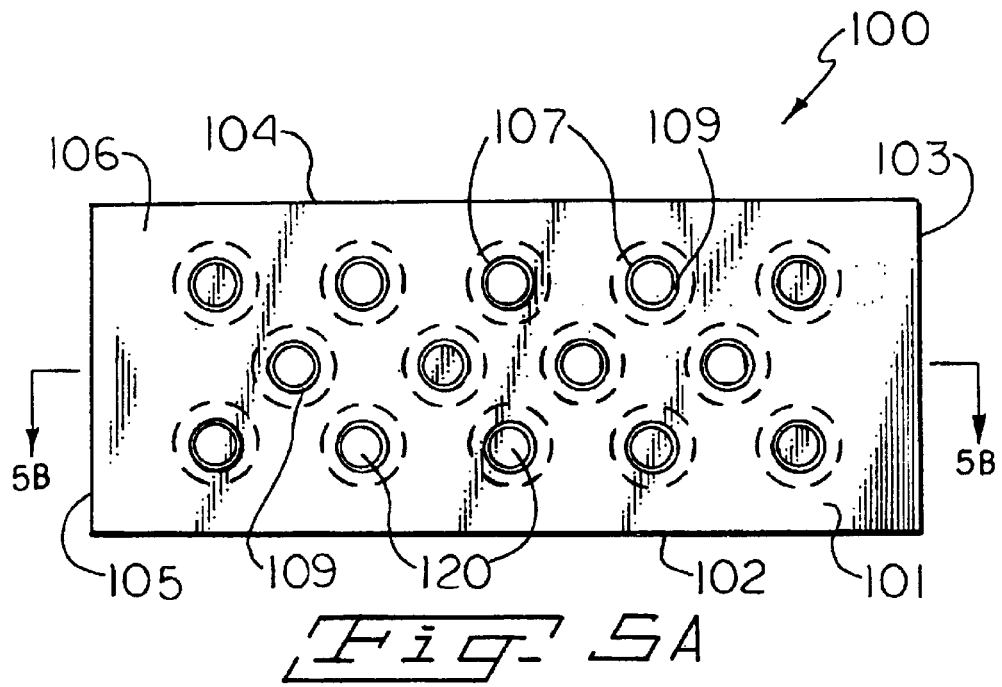
FIG. 5a is a schematic bottom illustration of a two piece die block in accord with the present invention.
Figure 5B:
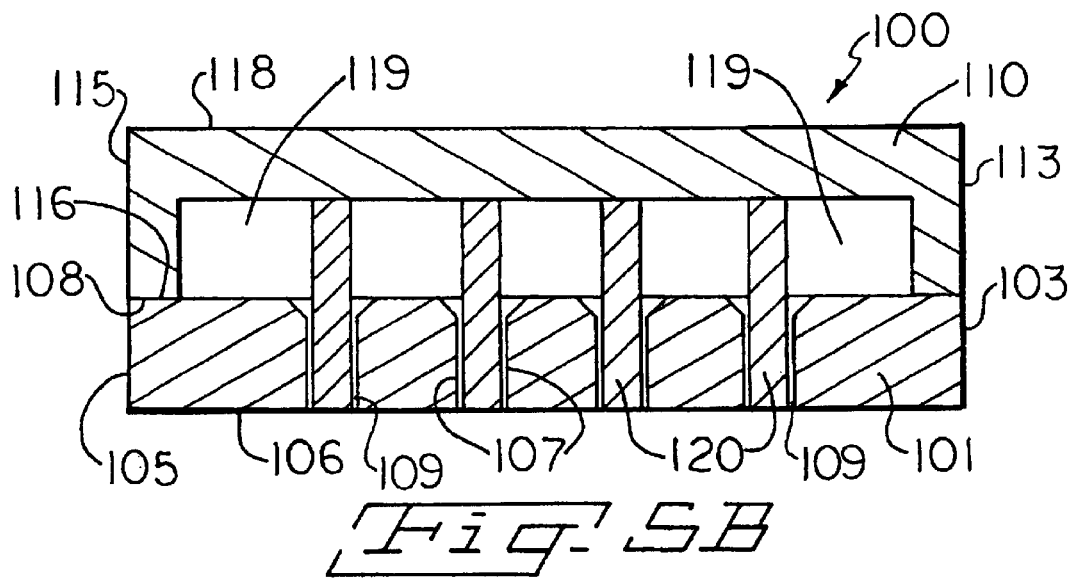

FIGS. 5A and 5B schematically illustrate a two piece die block in accord with the present invention. The die block, generally designated by reference numeral lo includes a first segment, nominally a bottom segment 101 and a second or top segment 110. Bottom segment 101 (FIG. 5B) has a first end 103, a generally parallel, but spaced apart, second end 105, a first side 102 (FIG. 5A), a generally parallel, but spaced apart, second side 104 (FIG. 5A), a lower surface 106 (FIG. 5B) and a generally parallel, but spaced apart, upper surface 108 (FIG. 5B). Bottom segment has defined therein a plurality of spaced apart apertures 107. Apertures 107 desirably have a hollow right cylindrical cross section such that they are in fluid communication with both the lower surface 106 and upper surface 108. Each aperture 107 preferably has a flared or countersunk segment proximate to, and intersecting with upper surface 108. In other words, aperture 107 preferably has the same general shape as aperture 59 (FIG. 2) even if dimensions differ. The Top Segment 110, illustrated only in FIG. 5B, has a first end 113, a generally parallel, but spaced apart, second end 115, a first side 112 (not shown), a generally parallel, but spaced apart, second side 114 (not shown), a lower surface 116 and a generally parallel, but spaced apart, upper surface 118. Top segment 118 has defined therein a foamable composition receiving and distribution cavity 119 that is in fluid combination with a foamable composition source (not shown) and the plurality of apertures 107 when the die block is assembled as shown in FIG. 5B. Top segment has secured thereto a plurality of pins 120, preferably one for each aperture in the embodiment shown in FIGS. 5A and 5B. Each combination of a pin 120 and an aperture 107 preferably forms an annular ring or die gap 109. The foamable composition desirably moves from cavity 119 through the plurality of annular rings 109 to lower surface 106 of bottom 101 where it exits the die and begins foaming.

The die block illustrated in FIGS. 5A and 5B represents a variation of the die block shown in FIG. 1. Both die blocks lead to hollow foam strand structures. The die block illustrated in FIGS. 5A and 5B can be modified in a manner similar to that illustrated in FIG. 2 to allow formation of both hollow foam strand structures and solid foam strands in preparing a coalesced, composite foam structure that includes both hollow and solid foam strands.

Figure 6:
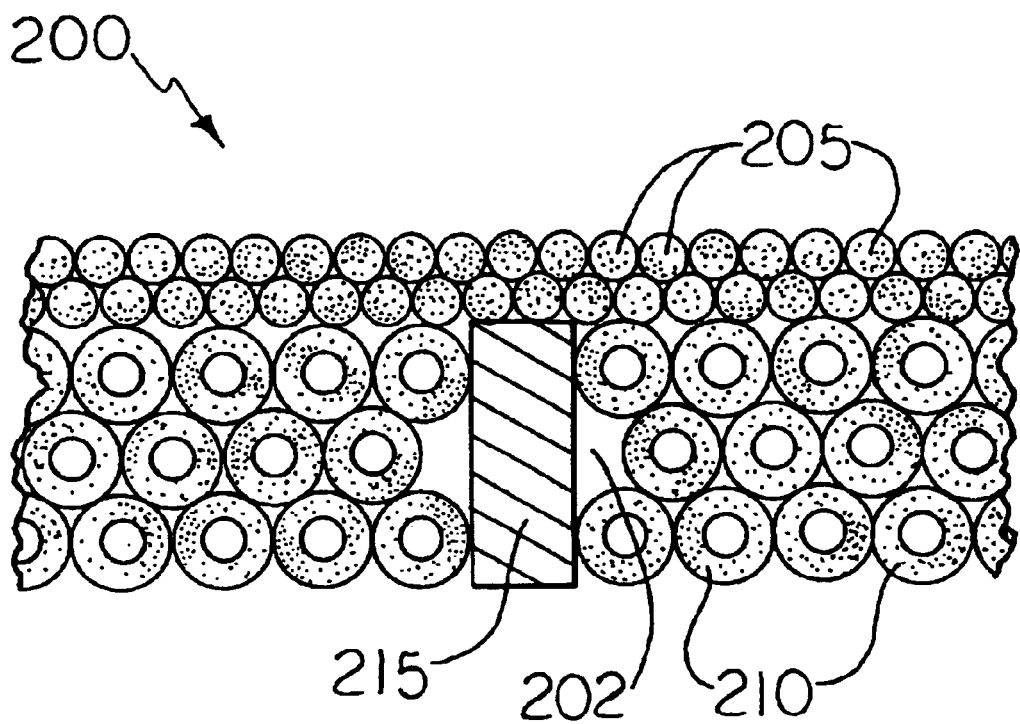
FIG. 6 is a schematic illustration of a cellular foam structure of the present invention that is suitable for use in conjunction with a wall building fabricated from studs.

FIG. 6 schematically illustrates a cellular foam structure in accordance with the present invention when used in conjunction with a framing stud member of a building wall segment. The cellular foam structure, designated by reference numeral 200 consists of two layers of coalesced solid foam strands 205 and three layers of coalesced hollow foam strands 210. The two layers of solid foam strands provide a relatively smooth and stiff or rigid surface that facilitates further construction activities such as installing siding, paneling or both to form a finished, exterior building wall segment. The three layers of hollow foam strands 210 are arranged so as to create a groove or slot 202 that accommodates framing stud member 215. Slot 202 preferably has a width that is narrower than that of framing stud member 215. With the width difference, hollow foam strands 215, being more flexible and compressible than the solid foam strands 205, provide a friction fit against adjacent surfaces of framing stud member 215. The friction fit provides an acceptable means to interfere with a flow of moisture or cold air from one side of the wall segment to the other. The number of solid foam strand layers and hollow foam strand layers will vary widely depending upon a chosen application. For example, one may eliminate solid foam strand layers or have as many as dozens of solid foam strand layers so long as there is at least one hollow foam strand layer, preferably several hollow foam strand layers up to and including many dozens of such layers. FIG. 6 merely illustrates an application employing a combination of coalesced solid foam strands and coalesced hollow foam strands.

Skilled artisans readily understand that FIG. 6 represents only a partial view of a building wall segment and that, in actual practice, one would use a much wider cellular foam structure with multiple grooves, each of which desirably accommodates a framing stud member 215. Skilled artisans also understand that, as with the structure illustrated in FIG. 4, many variations of this foam structure can be used in such a building wall segment. Skilled artisans can readily adapt these structures and many variations thereof in any of the end use applications described herein.

The above approach offers a number of advantages over conventional methods of stud wall construction and insulation. First, by incorporating stud spacing into the foam structure and providing for a friction fit via the compressible hollow foam tubes, one builds in a tolerance for less than exact spacing between studs. Second, one can insulate a wall segment simultaneously with or immediately following fabrication of that segment. This effectively eliminates a comparably more time consuming step of installing fiberglass bats, blowing in cellulose or generating urethane foam in spaces between studs. Third, the solid foam strand segment effectively serves as a house wrap because the foam strands have a skin. Fourth, the foam sheet or structure of the present invention is fully recyclable whereas urethane foam, fiberglass bats and blown-in cellulose pose recycling challenges. Although the above discussion relates to stud wall construction, similar benefits apply to other building construction such as rafter construction.

The overall width and length of the foam structure of the present invention is preferably selected so that it is of a size and weight that it can be easily handled by construction workers. In the United States, polymer foam sheet insulation is commonly sold in 48-inch (122 centimeter (cm)) widths, which easily accommodates standard frame construction using 16-inch (40.6 cm) center spacing for the support members. Similarly, the foam structure of this invention is preferably manufactured in a width equal to some multiple of the spacing of the support members in the wall being constructed. Widths of from 16 inches to 96 inches (40.6 to 243.8 cm) are preferred, and widths of 32 to 64 inches (81.2 to 162.4 cm) are more preferred. Board lengths are not critical, and are selected for convenience in handling. Lengths of from 4 to 16 feet (1.22 to 4.88 meters (m)) are typically used in frame construction and are suitable for the board of this invention. In other countries, polymer foam sheet insulation codes and construction practices may dictate different sheet sizes. Such sizes fall within the scope of the present invention.

In addition to serving as an insulating means for wall construction, foam or structures like that shown in FIG. 4 may also be used to fill and insulate spaces between rafters in a roof construction or spaces between floor joists. While rectangular structures, desirably embodying both hollow and solid strands to impart a combination of rigidity and flexibility, may satisfy many space requirements, other shapes and sizes also work and fall within the scope of the present invention. If desired, one can use only the hollow foam strands to fill such spaces.

The foam structures of the present invention, irrespective of whether they comprise only hollow foam tubes or a combination of hollow foam tubes and solid foam strands, have a variety of practical applications. For example, a structure like that shown in FIG. 4 or FIG. 6, but lacking slot 202 (FIG. 6), may be used as a leveling board or surface, particularly for uneven masonry and concrete walls and floors. As an alternative, such structures may be used in renovating and repairing flat roofs as the relatively compressible hollow tubes effectively allow one to eliminate the step of stone removal provided there is no concern about the weight of such stones. Structures that include only the hollow foamed tubes may function as masonry cavity wall insulation as the hollow tubes conform to uneven brick or stone surfaces more readily than solid foam strands. Such hollow strand structures, with or without gaps for the studs, may also be used to fill space(s) between studs and a prefabricated exterior, such as cement or concrete, brick or stonework, and wallboards or siding.

The foam structures may also be laminated to various facing materials, including but not limited to gypsum board, cementitious board, plywood, and oriented strand board. The foam portion of these laminates may be composed of hollow strands only or a combination of solid and hollow strands as described above.

When placed vertically beneath poured slab foundations, structures with only hollow foamed tubes alleviate at least some stresses that promote concrete cracking. The vertical orientation also provides benefits for packaging applications due to its high-energy absorption to density ratio and built-in drainage capability. Perforation of foam surfaces provides a mechanism for sound drainage from an adjacent space. The foam structures, with or without associated solid foam strands, yield benefits in terms of thermal and sound insulation while providing built-in conduits for wires. Foam structures of the present invention also find use in a variety of automotive applications. For example, structures having at least one layer, preferably several (even dozens) layers of hollow foam tubes and, optionally, at least one, preferably several (up to and including several dozen) layers of solid foam strands may be used as part of an automobile interior headliner or as part of an energy absorbing structure inside an automobile passenger compartment. The number and arrangement of coalesced hollow foam strands and optional coalesced solid foam strands may take on any configuration within the imagination of skilled artisans without departing from the spirit and scope of the present invention.

Hollow foam tubes produced in accord with the present invention have a product density that is desirably at least 0.3 pound per cubic foot (pcf) (5 kilograms per cubic meter (kg/m$^3$). Skilled artisans understand that as polymer or foamable material density increases, resultant foam structure densities also increase to as much as 40 pcf (640 kg/m$^3$). The foam structure density is preferably from 0.3 to 20 pcf (5 to 320 kg/m$^3$). Hollow foam tubes with a product density of, for example, three to 12 pcf (48 to 192 kg/m$^3$) offer potential utility as inserts for automobile bumpers as the tubes should buckle upon impact and provide a relatively large surface area for energy dissipation. Product or resultant foam structure density is believed to provide a more accurate reflection of density than foam density due to difficulty in determining density of hollow foamed tubes using a conventional water immersion test. "Foam density", when used in conjunction with hollow foam tubes, refers to density of the foam tube walls rather than to a complete foamed tube which necessarily includes a hollow space. Products of the claimed invention have a foam density that is desirably within a range of from 0.35 to 60 pcf (6 to 960 kg/m$^3$), preferably from 0.5 to 40 pcf (8–640 kg/m$^3$).

Foam structures, particularly those that contain few, if any, solid foam strands, have potential use as mattress or bedding inserts with channels for air ventilation. If the foam structures have a high open cell content (typically on the order of 90% or more open cells), they serve as suitable candidates for filtration applications and absorption (both liquid and gas) applications. The foregoing discussion of potential utility merely illustrates a few of the uses for the foam structures of the present invention. Skilled artisans can readily envision a much greater number. Even then, they will only scratch the surface of potential uses.

Skilled artisans recognize that one may vary any one or more of the number, type and spacing of apertures without departing from the scope of the present invention. One may also create open channels or voids in a foam structure by plugging or closing some die openings in dies used to fabricate the foam structures. U.S. Pat. No. 4,824,720, the relevant teachings of which are incorporated herein by reference, discloses such a technique. One may further increase resultant foamed article size by increasing the number of apertures. One may also, for example arrange paired apertures so as to form a desired shape other than generally rectangular. Any shape or arrangement of paired apertures may be altered by interspersing single apertures among the paired apertures to dispose solid foam strands among hollow, tubular foam strands. Solid foam strands may also form a core surrounded by hollow, tubular foam strands, a wall around a core of hollow, tubular foam strands or a combination or both. The present invention is not limited to any particular geometric shape or combination of hollow and solid strands. Virtually any shape or combination of solid and hollow strands falls within the scope of the present invention. Such shapes and combinations include multiple layers or regions of either solid or hollow strands. For example, a first and third layer of a multiple layer plank may comprise hollow strands with a second or middle layer that comprises solid strands. Alternatively, a right and a left hand section of a multiple section foam might be hollow strands while the middle section might be solid strands. By doing so, one would create a board with rigid center and flexible edges.

One may also use dissimilar polymeric compositions to form different portions of the foamed strand structure. For example, one might choose to form the solid and hollow strands-from different polymeric compositions. The strands of different composition can be adhered together by any means so long as the strands have sufficient inter-strand adhesion for desired purposes. Known adhesion techniques involve use of adhesives and application of heat or thermal radiation. A preferred technique employs continuous extrusion via two or more different extruders and strand to strand coalescence after strands exit their respective die orifices. Alternatively layers of foam strands could be cross-laminated by the adhesive means described above.

One can also produce a structure where every hollow strand or selected hollow strands are composed of two or more dissimilar materials polymeric, organic or inorganic materials. This could be produced by coextrusion, cofoaming, spraying, or coating (as with latex) materials or vapor phase deposition on the inner surface of the hollow strands or by dipping the strands into solutions or dispersions with subsequent coating of the additional material onto the strand surface.

The foam structures of the present invention are suitably fabricated from foamable compositions that comprise an organic polymer, a blowing agent and a nucleating agent. The polymer is suitably selected from the group consisting of alkylene aromatic polymers such as polystyrene; rubber-modified alkylene aromatic polymers more commonly known as high impact polystyrene (HIPS) alkylene aromatic copolymers such as styrene/acrylonitrile or styrene/butadiene; hydrogenated alkylene aromatic polymers and copolymers such as hydrogenated polystyrene and hydrogenated styrene/butadiene copolymers; α-olefin homopolymers such as low density polyethylene, high density polyethylene and polypropylene; linear low density polyethylene (an ethylene/octene-1 copolymer) and other copolymers of ethylene with a copolymerizable, mono-ethylenically unsaturated monomer such as an α-olefin having from 3 to 20 carbon atoms; copolymers of propylene with a copolymerizable, mono-ethylenically unsaturated monomer such as an α-olefin having from 4 to 20 carbon atoms, copolymers of ethylene with a vinyl aromatic monomer, such as ethylene/styrene interpolymers; copolymers of ethylene with an alkane such as an ethylene/hexane copolymer; thermoplastic polyurethanes (TPU's); and blends or mixtures thereof, especially blends of polystyrene and an ethylene/styrene interpolymer. In addition, blends of one of the foregoing polymer with a rubber, such as polybutadiene or polyisoprene, also yield satisfactory results. Other suitable rubbers include ethylene/propylene rubbers, ethylene/propylene/diene monomer (EPDM) rubbers and natural rubbers provided such rubbers are converted to coalesced foam strands prior to cross-linking.

Suitable unsaturated monomers include $C_{1-4}$ alkyl acids and esters, ionomeric derivatives of such acids, $C_{2-6}$ dienes and $C_{3-9}$ olefins. Examples of such monomers include acrylic acid, itaconic acid, maleic acid, methacrylic acid, acrylic acid, esters of such acids such as ethyl methacrylate, methyl methacrylate, ethyl acrylate and butyl acrylate, vinyl esters such as vinyl acetate, carbon monoxide, maleic anhydride, propylene, isobutylene, and butadiene. Illustrative ethylene copolymers include ethylene/propylene, ethylene/butene-1 and ethylene/octene-1.

Other suitable polymers include polyvinyl chloride, polycarbonates, polyamides, polyimides, polyesters such as polyethylene terephthalate, polyester copolymers such as polyethylene terephthalate-glycol (PETG), phenol-formaldehyde resins, thermoplastic polyurethanes (TPUs), biodegradable polysaccharides such as starch, and polylactic acid polymers and copolymers. The polymer is preferably polyethylene (PE), polystyrene (PS), polypropylene (PP), a blend of PS and an ethylene/styrene interpolymer (ESI), a blend of ESI and PE, a blend of ESI and PP, a blend of PS, PE and ESI or a blend of ESI with any one or more polyolefin or ethylene/alpha-olefin copolymers, terpolymers or interpolymers produced using a metallocene catalyst or a constrained geometry catalyst (such as The Dow Chemical Company's INSITE™ catalyst).

U.S. Pat. No. 3,723,586, the teachings of which are incorporated herein by reference, lists a number of foamable resins at column 6, lines 21–51. Such resins include polymers of one or more vinylidene monomers. The vinylidene monomers include, for example, ethylene, propylene, butadiene, styrene, alpha-methylstyrene, ortho-, meta- or para-methylstyrene, and other aromatic alkylstyrenes. The vinylidene monomers also include substituted monomers such as, acrylonitrile, methacrylonitrile, vinyl chloride, vinyl acetate and other vinyl esters, methyl acrylate, ethyl acrylate, propyl acrylate, butyl acrylate, and corresponding methacrylates. The resins include toughened polystyrene or polystyrene that is physically or chemically combined with a minor proportion (on the order of 1–15 wt, based on polymer weight) of a natural or synthetic rubber such as a linear or branched polymer of a conjugated diene like butadiene, or isoprene. The polystyrene and toughened polystyrene may also include small amounts of one or more other vinylidene monomers such as acrylonitrile or methyl methacrylate.

U.S. Pat. No. 4,824,720 describes a number of foamable, non-aromatic olefin polymers at column 3, line 57 through column 4, line 22. The teachings of this patent are incorporated herein by reference. Such polymers include copolymers of ethylene and a copolymerizable polar monomer, especially a carboxyl-containing comonomer. Examples include copolymers of ethylene and acrylic acid or methacrylic acid and $C_{1-4}$ (one to four carbon atoms) alkyl esters or ionomeric derivatives thereof; ethylene/vinyl acetate (EVA) copolymers; ethylene/carbon monoxide (ECO) copolymers; anhydride containing olefin copolymers of a diene and a polymerizable olefin monomer other than ethylene, such as an ethylene/propylene/non-conjugated diene (EPDM) polymer; copolymers of ethylene and an alpha-olefin ($\alpha$-olefin) having a very low molecular weight (weight average or $M_w$), such as those having a density of less than 0.92 g/cc; blends of any of the foregoing copolymers; and blends of any of the foregoing copolymers with a polyethylene (high, medium or intermediate and low density). An "ionomer" is a partially or completely neutralized olefin polymer or copolymer with pendant carboxylic acid groups (e.g. an ethylene/acrylic acid (EAA) copolymer). Neutralization occurs by way of cationic groups such as $NH_4+$, Na+, Zn++, and Mg++.

Skilled artisans recognize that the various descriptions of foamable materials presented herein are merely illustrative. They also recognize that many of the listed materials can be combined or blended where desired.

The foamable compositions may include one or more conventional foam composition additives such as stabilizers, fillers and reinforcing materials. Fillers and reinforcing materials include, for example, conventional materials such as conductive carbon black, furnace black, thermal black, graphite, clays, metal filings or powders, inorganic salts (e.g. calcium carbonate), wood flour, milled corn husks, milled rice hulls, and nanometer-size materials (more commonly known as "nanofillers").

Suitable alkylene aromatic polymers comprise at least one monovinylidene aromatic monomer such as styrene, alkylstyrenes including those with at least one alkyl substituent with one to four carbon atoms ($C_{1-4}$), and halogenated styrenes. Specific examples include styrene, alpha-methylstyrene, ortho-, meta- or para-methylstyrene or ethylstyrene as well as chlorostyrene. Suitable comonomers include acrylonitrile, acrylic acid, acrylic acid esters such as butyl acrylate, olefinic monomers such as ethylene or propylene, and mono- or poly-unsaturated olefinic monomers such as butadiene, isoprene and mixtures thereof.

Polyester resins have a combination of low melt strength and high melting temperature that usually makes it difficult to produce foams of low densities and large cross-sections. Chemically modified polyester resins, such as para-maleic anhydride modified polyethylene terephthalate, suffer similar shortcomings and typically produce no more than one inch (25 mm) thick foams with a density of no less than 2.5 pcf (40 kg/m$^3$). The present invention allows a skilled artisan to prepare hollow, low density foamed polyester resin structures. One hypothesis suggests that the hollow strand structure promotes rapid cooling and consequent crystallization of a foamable polyester resin composition. The hollow tube configuration increases available surface area for loss of blowing agent and, as a result, speeds removal of heat from the composition. The combination of rapid cooling and crystallization enables formation of stable foam cell walls.

The foamable compositions also include a blowing agent composition or combination. Skilled artisans may readily select a suitable blowing agent composition without undue experimentation. Illustrative blowing agents include isobutane (with or without carbon dioxide ($CO_2$)), water, $CO_2$, nitrogen, noble gases such as argon, nitrous oxides such as nitric oxide (NO), nitrous oxide ($N_2O$) and nitrogen dioxide ($NO_2$), and air. Blowing agents may also be generated in situ from chemical compounds such as azo-compounds (e.g. azodicarbonamide, and azodiisobutyro-nitrile), nitroso-compounds (e.g. N,N'-dinitrosopentamethylenetetramine), or aromatic hydrazides (e.g. P,P'-oxybenzenesulfonyl hydrazide) to generate nitrogen by thermal decomposition and mixtures of carbonates and acids to generate carbon dioxide. Other known blowing agents include hydrocarbons such as ethane, ethylene, propane, propylene, butane, butylene, isobutane, isobutene, pentane, isopentane, cyclopentane, hexane, heptane, cyclohexane and mixtures thereof; ethers such as dimethyl ether (DME), methyl ethyl ether and diethyl ether; alcohols such as methanol, ethanol, propanol, isopropanol, butanol, pentanol, hexanol and mixtures thereof; and any of a variety of partially halogenated hydrocarbons such as chloroethane, chlorodifluoromethane (R-22), 1-chloro-1,1-difluoroethane (R-142b), 1,1,1,2-tetrafluoroethane (R-134), pentafluoroethane ((R-125), 1,1-difluoroethane (R-152a), 1,1,1-trifluoroethane (R-143a), 1-fluoroethane (R-161), difluoromethane (R-32), 1,1,1,3,3-pentafluoropropane (HFC-245 fa), 1,1,1,3,3-pentafluorobutane (HFC-365 mfc) and mixtures thereof.

Blowing agent compositions desirably lack components that have ozone depletion potential (ODP). The blowing agent composition preferably comprises at least one blowing agent selected from water, carbon dioxide, nitrogen, a nitrous oxide, a noble gas, air, a hydrocarbon, an ether, a lower (1 to 6 carbon atoms) alcohol, a partially halogenated hydrocarbon, ammonia, water and mixtures of two or more of such blowing agents. Particularly suitable blowing agent compositions include isobutane (with or without carbon dioxide ($CO_2$)), $CO_2$ (with or without at least one of water, ethanol, isopropanol and dimethyl ether); at least one of R-134a, R-134, R-142b and R-152a, with or without at least one of ethanol, isopropanol, dimethyl ether, water and carbon dioxide; dimethyl ether with or without at least one of water, ethanol, isopropanol and carbon dioxide; and water. The foregoing compositions may also include one or more hydrocarbons such as propane, butane, isobutane, pentane, isopentane, neopentane and cyclopentane.

The blowing agent and blowing agent combinations described herein merely illustrate some that will work in accord with the present invention. Skilled artisans can readily select suitable blowing agents or blowing agent combinations for a chosen foamable composition.

Incorporation of a blowing agent into a molten polymer material to form a foamable composition involves use of known apparatus such as an extruder, a mixer or a blender. One preferred procedure involves mixing the blowing agent with molten polymer under an elevated pressure sufficient to prevent substantial expansion of the molten polymer and disperse the blowing agent throughout the molten. polymer in a generally uniform manner.

The blowing agent is present in an amount sufficient to generate a desired level of foaming when the foamable composition exits die orifices. A suitable amount lies within a range of from 0.2 to 50 percent by weight (wt %), based on foamable composition weight. An amount less than 0.2 wt % leads to an insufficient degree of foaming. An amount greater than 50 wt % can be used, but offers limited performance advantages while increasing cost and leading to increased difficulty in controlling foaming without distortion. The amount is preferably within a range of 0.2 to 25 wt %, based on foamable composition weight.

The foamable compositions of the present invention also comprise one or more additives. Suitable additives include nucleating agents, extrusion aids, antioxidants, flame retardants, colorants and pigments.

Nucleating agents help control foam cell size. Conventional nucleating agents include inorganic substances such as calcium carbonate, calcium silicate, talc, clay, titanium dioxide, silica, barium sulfate, diatomaceous earth, and mixtures of citric acid and sodium bicarbonate. Stearic acid salts such as calcium stearate and magnesium stearate also provide satisfactory results. Suitable amounts of nucleating agent lie within a range of from 0.01 to 5 parts by weight per hundred parts by weight of polymer resin (pph), both ends of the range being included. The range is desirably from 0.1 to 3 pph.

Preparing the hollow multistrand or hollow coalesced strand polymer foam structures of the present invention involves a mult-istep process. Step one involves providing a foamable composition that comprises a blowing agent composition and at least one film-forming composition, preferably a foamable polymer. The polymer is desirably selected from the group consisting of olefin homopolymers, olefin copolymers, alkylene aromatic polymers and copolymers, polyesters, and blends of ethylene/styrene interpolymer and polystyrene. The foamable composition is preferably in a gel state. The foamable composition optionally comprises at least one additive or modifier selected from fire retardant chemicals, stabilizers, antioxidants, colorants, permeability modifiers, plasticizers, static dissipative agents, anti-static agents such as amines, amides and stearates, permeation modifiers such as stearyl stearamide, glycerol monostearates (GMS), glycerol mono-di-stearates (GMDS), surfactants and opacifiers. Sequential step two focuses upon extruding the foamable composition through a die having a plurality of first orifices that yield a hollow extrudate. Extrusion typically occurs at a temperature above the polymer's $T_g$, or for those having sufficient crystallinity to have a $T_m$, near the $T_m$. Step three centers upon converting the hollow extrudate into foamed hollow extrudate strands. Step four maintains the foamed hollow extrudate strands at an elevated temperature for a period of time sufficient to effect adhesion between adjacent individual strands and yield a hollow multistrand polymer foam extrudate. Step five allows the hollow multistrand foam extrudate to cool to a temperature sufficient for further handling and recovery while substantially maintaining foam dimensional stability.

A skilled artisan can envision numerous alternative processes for adhering the strands to one another. They include, but are not limited to, the use of adhesives, elevated temperatures to partially melt the surfaces of the strands, targeted use of infrared (IR), microwave (MW) or radiofrequency (RF) radiation to impart adhesive properties to the surfaces of the foam tubes. "Adhesion" (and its variations) means that adjacent strands are attached together either at enough points along the respective strand lengths or continuously (or nearly so) to impart structural integrity to a foam structure. "Coalescence" may be regarded as a special subset of adhesion in that foam strands exiting extruder dies typically retain sufficient heat to render their surfaces tacky for long enough to effect the same structural integrity when adjacent strands come into contact with each other.

Preparation of the foamable composition of step one suitably involves mixing the film-forming composition, preferably a polymer, and blowing agent(s) in a mixer, preferably a heated extruder, to form an extrudable mixture, preferably in a melt state, and then at least partially cooling the extrudable mixture from a melt state to a gel state. Although preparation of the foamable composition preferably employs a heated extruder, skilled artisans can readily substitute other apparatus that accomplish the same purpose. U.S. Pat. No. 5,817,705 and U.S. Pat. No. 4,323,528, the teachings of which are incorporated herein by reference, discloses one such apparatus. This apparatus, commonly known as an "extruder-accumulator system" allows one to operate a process on an intermittent, rather than a continuous, basis. The apparatus includes a holding zone or accumulator where the foamable composition remains under conditions that preclude foaming. The holding zone is equipped with an outlet die that opens into a zone of lower pressure, such as the atmosphere. The die has an orifice that may be open or closed, preferably by way of a gate that is external to the holding zone. Operation of the gate does not affect the foamable composition other than to allow it to flow through the die. The extrusion die of the second aspect of the invention, or a variation thereof, preferably takes the place of the die disclosed in the references.

By forcing the extrudable mixture through the extrusion die of the second aspect of the invention, one obtains (a) a plurality of separately extruded and thereafter coalesced hollow foam strands or (b) a combination of a plurality of separately extruded and thereafter coalesced solid foam strands and a plurality of separately extruded and thereafter coalesced hollow foam strands. In a preferred embodiment, a grouping of solid, coalesced foam strands forms one part of a composite cellular foamed structure and a grouping of hollow, coalesced foam strands forms a second part of a composite cellular foamed structure. The blowing agent composition at least partially determines the temperatures for each of the process steps. Preparation of such a composite foamed structure preferably employs a die that has a plurality of first orifices or orifice sets that yield hollow foam strands and a plurality of second or single orifices that yield solid foam strands.

Where the extrusion die provides for both solid and hollow foam strands, die apertures or orifices for both the solid and hollow foam strands may take on nearly any geometric shape so long as the shapes yield, as appropriate, the respective solid and hollow foam strands. Suitable geometric shapes include round, square, polygonal, x-shapes, cross-shapes and star-shapes. Selection of a particular shape or combination of shapes allows production of a cellular foamed structure with a specific profile or shape. The shape is preferably round or circular, especially for the hollow foam strands. Where the cellular foam structures of the invention comprise both hollow foam strands and solid foam strands, the geometric shapes, while preferably the same, may differ without departing from the scope and spirit of the invention.

Foam expansion following extrusion of a foamable composition from the extrusion die suitably takes place in a normal atmospheric environment. If desired, however, a sub-atmospheric environment such as provided by a partial vacuum or a super-atmospheric environment such as provided by gaseous overpressure may also be used. Skilled artisans readily understand use of various pressures and measures to attain such pressures. Skilled artisans also understand the use of a steam chamber to reduce foam density when foamable compositions comprise polystyrene. Blends of polystyrene and ethylene/styrene interpolymer yield similar foam density reductions in a steam chamber.

Transportation of resultant foam structures away from the extrusion die suitably involves use of any of a variety of conventional conveying apparatus. Illustrative apparatus include continuous belts or rollers. If desired, temperature control means may be incorporated into such apparatus.

The foam structures may, if desired, be subjected to any one or more of several conventional post-treatment procedures. Such procedures include, for example, reduction of foam density through exposure to an elevated temperature environment such as that established with an infrared oven, a steam oven or a hot air oven, and surface modification through, for example, embossing, re-melting or bonding a polymer film to the foam structure.

The foam structures preferably comprise foamed strands wherein foam cells are predominantly closed cells as determined in accordance with American Society for Testing and Materials (ASTM) Test D-2856A The foam structures preferably have a closed cell percentage of greater than 50 percent, based on total number of cells, not including interstitial channels or voids between foam strands or channels within the hollow strands that form at least part of the foam structures. Within the foam portion of a given foam strand, average cell sizes typically range from 25 to 7000 micrometers ($\mu$m), preferably from 50 to 2000 $\mu$m and more preferably from 100 to 1500 $\mu$m Such foam structures provide suitable thermal insulation, sound insulation and dimensional stability parameters.

While predominantly closed cell structures may be preferred for a number of applications, other applications readily employ cell structures where open cells predominate. Such other applications include sound control, rapid release (curing) of blowing agent from the foam, and foams that have a softer feel when lightly touched.

If the foamable composition comprises a cross-linkable composition such as polyethylene or polyurethane or a polyol—isocyanate blend and one or more additives that promote cross-linking, the resulting foam structure may be subjected to conditions that effect cross-linking and convert the cross-linkable composition to a thermoset polymer. Skilled artisans can readily select appropriate cross-link additives and cross-linking or curing conditions for any given composition without undue experimentation.

The following examples illustrate, but do not in any way limit, the present invention. All parts and percentages are based upon weight, unless otherwise specified. Arabic numerals identify examples (Ex) of the present invention and letters of the alphabet denote comparative examples (Comp Ex).

EX 1

Prepare a flexible, hollow, multi-strand polymer foam using a single screw extruder and a die like that illustrated in FIG. 1. The die has defined therein a plurality of aperture pairs. Each aperture of the pair has a shape resembling that of a half moon with a gap of 0.030 inch (0.076 centimeter (cm)) between arcs that form the shape. Each pair centers on a pin having a diameter of 0.025 inch (0.064 cm). The combination of the pins and aperture pairs forms a plurality of plugged holes, each hole being separated from its nearest neighbor by a distance of 0.2 inch (0.508 cm). The single screw extruder (Killion KN-1.75 inch (3.18 cm)) has a length to diameter (L/D) ratio of 24 and operates under conditions sufficient to convert a polymer composition to flowable melt and combine the flowable melt with a generally homogeneous dispersion of a blowing or expansion agent in such a manner as to provide a foamable gel. The foamable gel comprises 85.8 parts by weight per 100 parts of polymer composition (pph) of a linear polypropylene homopolymer (melt flow rate (MFR), determined in accordance with American Society for Testing and Materials (ASTM) Test 1238, of 0.5 grams per 10 minutes (g/10 min), available from Montell under the trade designation Profax® 6823), 14 pph isobutane blowing agent and 0.2 pph talc (nucleating agent). The foamable gel exits the extruder via the die at a foaming temperature of 158° C. and yields a flexible foam product comprising a plurality of hollow, foamed tubes. Each tube has a predominantly closed cell structure with an average cell size of 0.25 millimeters (mm).

EX 2

Using a Killion KN-1.75 single screw extruder with a L/D ratio of 24 in conjunction with the die of Ex 1, prepare a hollow, multi-strand foam product from a polystyrene composition at a foaming temperature of 135° C. The composition-comprises 100 parts polystyrene resin (PS 168, a 168,000 MW polystyrene resin available from The Dow Chemical Company), 0.2 part of talc (per one hundred parts of resin or pph), 0.1 pph calcium stearate, 7.5 pph HCFC-142b (hydrochlorofluoro carbon), 2.0 pph ethyl chloride, and 1.0 pph carbon dioxide. Upon extrusion the foamed hollow strands adhere to each other to form a coalesced strand foam product with a predominantly closed cell structure. As foamed, the product has a density of 23 kg/m$^3$. Exposing the product to a steam chamber treatment for one 1 minute reduces product density to 13 kg/m$^3$.

EX 3

Duplicate Ex 2 save for using a die like that shown in FIG. 2 rather than the die used in Ex 1. The resulting coalesced foam strand product has two groups of strands. One group includes solid (as opposed to hollow) foam strands and the other group contains hollow foam strands as in Ex 1 and Ex 2. The foam strands, whether solid or hollow, contain predominantly closed cells.

EX 4

Duplicate Ex 2 save for using a polypropylene (PP) composition rather than a polystyrene composition and increasing the foaming temperature to 158° C. The PP composition includes 75 parts PP homopolymer (Profax® 6823, commercially available from Montell), 25 parts of branched PP (PF814, commercially available from Montell), 0.4 pph (based on combined weight of PP resins) talc, 0.3 pph calcium stearate and 10 pph isobutane. Closed cells predominate in the resulting coalesced, hollow strand foam product. The product has a density of 16 kg/m³.

EX 5

Duplicate Ex 4, but use the die of Ex 3 to produce a coalesced, hollow strand foam product with both solid and hollow foam strands.

EX 6

A formulation consisting of 100 pph branched polypropylene polymer Profax® PF-814 (from Montell), 0.4 pph of talc, 0.6 pph of calcium stearate and 3 pph of isobutane was extruded to a hollow strand die at 160° C. to form a medium density product of approx. 112 kg/m3 with foamed tubes adhered together. Such a product can be used in articles such as energy absorbing structures like automotive bumpers and side impact countermeasures.

EX 7

Coated Foam Structure

Dip a foamed structure produced as in Example 2 into a carboxylated styrene-butadiene latex ($T_g$ of 9° C., Dow Latex CP 638 NA, available from The Dow Chemical Company) formulated with surfactant to wet the polymer surface of the polymer strands. This creates a surface on the exterior of the strands consisting of the styrene/butadiene polymer.

Carboxylated styrene-butadiene polymers vary in performance depending upon factors such as polymer composition. As such, the surface that results from dip coating may vary from rubbery and potentially impact-absorbing to tacky. The coating may have other specific desired properties. Coating properties may be readily varied by one of ordinary skill in the art, merely by choosing a different latex with different properties such as $T_g$. Similar results are expected with other latexes including, but not limited to, acrylate latexes.

What is claimed is:

1. A cellular foam structure comprising a plurality of coalesced, hollow foamed extudate strands wherein the strands have two or more different polymeric compositions, each composition being at least one film-forming material selected from the group consisting olefin homopolymers, olefin copolymers, alkylene aromatic polymers and copolymers, polyesters and copolymers, polycarbonates, polyamides, polyimides, halogenated olefin polymers and copolymers, natural polymers, proteins, polysaccharides, thermoplastic polyurethanes, and blends of polystyrene and ethylenestyrene interpolymer.

2. The structure of claim 1, wherein the foam has a closed cell content, as determined in accordance with ASTM D-2856A, of greater than 50 percent, based on total number of cells, not including interstitial channels or voids between foam strands or channels within the hollow strands that form at least part of the foam structures.

3. The structure of claim 1, wherein the foam has an open cell content, as determined in accordance with ASTM D-2856A, of greater than 50 percent, based on total number of cells, not including interstitial channels or voids between foam strands or channels within the hollow strands that form at least part of the foam structures.

4. The structure of claim 1, wherein foamed portions of the structure have a foam density within a range of from 0.35 to 60 pounds per cubic foot (6 to 960 kilograms per cubic meter).

5. An article of manufacture fabricated, at least in part, from the foam structure of claim 1, wherein the article is selected from the group consisting of sound insulation structures, thermal insulation structures, energy absorbing structures, packaging structures, cavity filling structures, air distribution structures, filter structures, impact energy management structures, surface leveling structures, fluid and gas absorption and retention structures, object supporting structures, bedding structures, integrated building structures and geophysical structures.

6. The structure of claim 1 further comprising a facing material selected from the group consisting of gypsum board, cementitious board, plywood and oriented strand board, the facing material being adhered to at least an external surface portion of the coalesced, hollow foamed extrudate strands.

7. The structure of claim 1, further comprising a plurality of solid foamed strands.

8. An article of manufacture fabricated, at least in part, from the foam structure of claim 7, wherein the article is selected from the group consisting of sound insulation structures, thermal insulation structures, energy absorbing structures, packaging structures, cavity filling structures, air distribution structures, filter structures, impact energy management structures, surface leveling structures, fluid and gas absorption and retention structures, object supporting structures, bedding structures, integrated building structures and geophysical structures.

9. The structure of claim 1, wherein at least selected hollow foamed extrudate strands are composed of two or more dissimilar materials, said materials being polymeric, organic or inorganic materials.

10. The structure of claim 9, wherein one of the dissimilar materials is the polymeric composition that comprises the hollow foamed extrudate strands and a second dissimilar material is a layer disposed on an inner surface of the hollow strands.

11. The structure of claim 9, wherein one of the dissimilar materials is the polymeric composition that comprises the hollow strand and a second dissimilar material is a layer disposed on an external surface of the hollow strands.

12. The structure of claim 10, wherein a dissimilar material is a layer disposed on an external surface of the hollow foamed extrudate strands.

13. The structure of claim 12, wherein the dissimilar material on the external surface of the hollow foamed extrudate strands is the same as the dissimilar material on the inner surface of the hollow strands.

14. The structure of claim 12, wherein the dissimilar material on the external surface of the hollow foamed extrudate strands differs from the dissimilar material on the inner surface of the hollow strands.

* * * * *